United States Patent [19]
Lindberg et al.

[11] Patent Number: 4,556,425
[45] Date of Patent: Dec. 3, 1985

[54] ANTI-RUST AGENT, METHOD OF PRODUCING THE SAME AND METHOD OF PREVENTING CORROSION

[75] Inventors: Jarl J. Lindberg; Váinó Erá, both of Vantaa; Erkki Stróm, Helsinki, all of Finland

[73] Assignee: Ruoste-Esto Oy, Finland

[21] Appl. No.: 291,096

[22] Filed: Aug. 7, 1981

Related U.S. Application Data

[63] Continuation-in-part of Ser. No. 157,969, Jun. 9, 1980, abandoned, which is a continuation-in-part of Ser. No. 20,413, Mar. 14, 1979, abandoned.

[30] Foreign Application Priority Data

Mar. 21, 1978 [FI] Finland ................................. 780892

[51] Int. Cl.$^4$ ............................................... C09D 5/08
[52] U.S. Cl. ................................ 106/14.23; 106/123.2
[58] Field of Search ............... 106/14.34, 14.44, 14.28, 106/218, 237, 239, 123 TQ, 14.23; 260/97.5, 105

[56] References Cited

U.S. PATENT DOCUMENTS 2,367,462  1/1945  Farber ................................. 260/105
2,717,241  9/1955  Hook ............................. 106/123 TQ
3,128,195  4/1964  Patellis ......................... 106/123 TQ
3,253,937  5/1966  Stump ........................... 106/123 TQ

OTHER PUBLICATIONS

Zachary et al., *Tall Oil and Its Uses*, 1965, pp. 50–57.

Primary Examiner—Lorenzo B. Hayes
Attorney, Agent, or Firm—Steinberg & Raskin

[57] ABSTRACT

Tall oil pitch neutralized with calcium oxide to an acid number between 0 and 7 mg KOH per gram acts as an anti-rust or corrosion preventing agent. The agent may be used most conveniently in solution form. The agent is produced by neutralizing tall oil pitch with an acid number of 20–70 mg KOH per gram with a solution of calcium oxide at elevated temperature to the desired acid number between 0 and 7 mg KOH per gram. Application of this agent to a material normally subject to corrosion acts to prevent corrosion from occurring.

2 Claims, No Drawings

ANTI-RUST AGENT, METHOD OF PRODUCING THE SAME AND METHOD OF PREVENTING CORROSION

CROSS REFERENCE TO RELATED APPLICATIONS

This application is a continuation in part of our co-pending application Ser. No. 157,969, filed June 9, 1980, for "Binding Agent For Anti-Rust Compositions, Method of Producing The Same And Compositions Therewith", which in turn is a continuation in part of application Ser. No. 20,413, filed Mar. 14, 1979, for "Binding Agent For Anti-Rust Compositions, Method of Producing The Same And Compositions Therewith", both now abandoned.

BACKGROUND OF THE INVENTION

Tall oil pitch is obtained as a distillation residue of the conversion of crude tall oil. In Finland, the tall oil distilling plants produce about 20,000 tons of tall oil pitch annually.

This tall oil pitch may be used for various purposes. Its main use is for burning, the tall oil pitch being mixed with fuel oil and burned in power plants.

Tall oil pitch contains resins and fatty acids of the crude tall oil and unsaponifiable components. The resins and fatty acids of tall oil pitch react with calcium oxide which neutralizes the tall oil pitch and forms calcium soaps as a reaction product.

Tall oil pitch is characterized by the following: softening point (in °C.), acid number (in mg KOH per g) and the saponification number. The amount of calcium oxide required to neutralize the tall oil pitch is calculated from the acid number.

Literature in the field has described the manufacture of binding agents for coatings from tall oil pitch in which the esters have been modified with maleic anhydride ("Tall Oil and its Uses", L. G. Zachary, H. W. Bajak and F. J. Eveline, McGraw-Hill Inc., New York, 1965, page 50). There is therein described a process wherein polyol esters of tall oil pitch are modified with maleic anhydride. This thus neutralized tall oil pitch has a high acid number, and softening point of 100°-110° C.

This process carries with it several technical drawbacks. In the first place, the high energy consumption and the use of protective gas are factors which exert an unfavorable effect on the overall manufacturing costs. Secondly, the preparation of the solution requires a separate process, thus further increasing the costs. Still further, we have found that the preparation of the solution is further impeded by the formation of a gel in the case of high solid matter content. We have still further found that the high acid number of the coatings thus produced can cause corrosion on a metal base, and a coating of this kind therefore cannot properly be used as anti-rust agent for anti-rust compositions.

There is a distinct difference between tall oil and tall oil pitch. Tall oil pitch is a distillation residue obtained during the conversion of tall oil. Tall oil pitch is a pitch-like product which is totally different from oily tall oil in its chemical structure and consistency.

The criteria commonly employed in quality specification of tall oil products are the acid number and the saponification number. The following characteristic values have been reported for commercial tall oil (cf. "Tall Oil 108"):

Acid number, mg KOH per g: 189–194
Saponification number mg KOH per g: 193
Fatty acids %: 86–92
Resin acids %: 6–10
Unsaponifiable %: 2–4

According to the studies (cf. "Composition of Tall Oil Pitch"), tall oil pitch can be characterized on the basis of the following characteristic values:

Acid number mg KOH per g: 27–49
Saponification number mg KOH per g: 94–115
Free acids, %: 34,6–51,6
Esterified acids, %: 23,2–37,8
Unsaponifiable %: 25,3–30,1

As the above figures reveal, there is a substantial difference between tall oil and tall oil pitch. The differences between these products are clearly apparent, not only in the acid and saponification numbers, but also in chemical composition. Tall oil pitch is characterized by high contents of esterified acids and of unsaponifiable fraction. Tall oil, on the other hand, contains mainly fatty acids and no esterified acids at all.

U.S. Pat. No. 3,128,195 to A. Patellis relates to a method of making limed tall oil in which calcium oxide is used to neutralize a mixture of mineral oil, crude tall oil and tall oil pitch (26%). The acid number of the neutralized mixture is 8.2 and this mixture is used as a cement for fixing flooring tiles.

SUMMARY OF THE INVENTION

Generally speaking it has been found according to the present invention that tall oil pitch neutralized with calcium oxide to an acid number between 0 and 7 mg KOH per g acts as an effective anti-rust or anti-corrosion agent. The effectiveness of the neutralized tall oil pitch as an anti-corrosion agent is increased as the acid number approaches 0. Tall oil pitch neutralized to an acid number between 0 and 2 is most preferred for the purposes of the invention.

Still further in accordance with the present invention the tall oil pitch is neutralized with the calcium oxide to the desired acid number in a suitable solvent or solvent mixture.

It is thus a primary object of the present invention to provide anti-rust agents.

It is yet a further object of the present invention to provide inexpensive anti-rust agents and anti-rust compositions, the agents being obtained as a waste substance from the wood conversion industry.

It is still a further object of the present invention to provide a method of producing the anti-rust or anti-corrosion agents of the invention.

It is yet another object of the present invention to provide a method of preventing corrosion on materials normally subject to corrosion by application to the surface thereof of the anti-corrosion agents of the invention.

Still further, the present invention includes as an object the production of tall oil pitch having an acid number between 0 and 7 mg KOH per g which can be used as anti-corrosion agents and which, when applied to metallic surface form a film which adheres tightly to the metallic surface and prevents corrosion thereof.

Other objects and advantages of the present invention will be apparent from a further reading of the specification and of the appended claims.

With the above and other objects in view, the present invention mainly comprises as an anti-rust composition tall oil pitch neutralized with calcium oxide to an acid number between 0 and 7 mg KOH per g. The preferred acid number is between 0 and 2 mg KOH per g and most preferably is substantially 0.

The method of producing the anti-rust agent of the present invention mainly comprises neutralizing, with calcium oxide, tall oil pitch having an acid number between 20 and 70 mg KOH/g, dissolved in a solvent therefor, at an elevated temperature which is above the softening point of the tall oil pitch (determined by the ball-and-ring method), and up to 250° C. In producing the anti-rust agent of the invention it is preferred to remove excess calcium oxide from the tall oil pitch solution. This is most conveniently accomplished by centrifuging or filtering.

The method of preventing corrosion according to the present invention mainly comprises applying to the surface of a material subject to corrosion, for example a metallic surface, an anti-corrosion effective amount of tall oil pitch neutralized with calcium oxide to an acid number between 0 and 7 mg KOH per g.

Actually, any tall oil pitch can be neutralized in accordance with the invention. However, it is preferred in accordance with the invention to utilize for neutralization with the calcium oxide, tall oil pitch which has an acid number of preferably between about 20 and 70 mg KOH per g. Such tall oil pitch contains the resin and fatty acids of the crude tall oil as well as its unsaponifiable components. The resin and fatty acids react with the calcium oxide to neutralize the pitch, and calcium soaps are formed as reaction products.

It has been found that in accordance with the process of the present invention it is most advantageous to effect the neutralizing of the tall oil pitch at the elevated temperature indicated above in a suitable solvent such as a mixture of white spirit and ethanol. This not only provides lower energy consumption but it also permits the carrying out of the process without the use of a protective gas, thus resulting in a highly economical process.

Still another factor in favor of the economy of the process of the present invention is that it does not require a separate process for the preparation of the final solution. Likewise, when using the process of the invention the result is the avoidance of the formation of a gel with high solid matter content. As a consequence, the process of the invention results in the production of an anti-rust agent which has the necessary low acid number of 0-7 and which is highly suitable for use in the prevention of corrosion.

As indicated above, in carrying out the process of the present invention, the same should be effected at elevated temperature. This elevated temperature is above the softening point of the tall pitch oil. This softening point is determined in known manner by the ball-and-ring method. The temperature should, however, not be greater than 250° C.

As indicated above, in the process of producing the corrosion preventing agent for anti-rust compositions according to the present invention, the tall oil pitch is neutralized with calcium oxide in a suitable solvent or solvent mixture. Also as mentioned above, a mixture of white spirit and ethanol has been found to be particularly suitable. Of course, other solvents and solvent mixtures can be used, for example aliphatic and aromatic organic solvents, such as higher alcohols, kerosene, etc.

In order to achieve the best corrosion resistance, the excess of calcium oxide used in the neutralization of tall oil pitch is removed from the solution by filtering or centrifuging.

The process of the invention can result in the production of the neutralized tall oil pitch having an acid number between 0 and 7, which neutralized tall oil pitch, as will be demonstrated below, constitutes an effective anti-rust or anti-corrosion agent. The preferred acid number for this purpose is as close to zero as possible.

The anti-corrosion agents of the present invention may be combined with known corrosion inhibiting agents, such as phosphoric acid esters of fatty alcohols, which generally have the following structural formula:

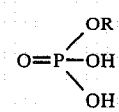

wherein R represents an alcohol radical having a carbon chain of 12-20 carbon atoms.

With neutralized tall oil pitch according to the present invention having an acid number substantially zero or close to zero, it is totally unnecessary to use any additional corrosion inhibiting agent of the above type since the corrosion effect of the neutralized tall oil pitch with such low acid number is totally complete in and of itself. With the higher acid numbers approaching 7, it is not necessary to add any additional corrosion inhibiting agent to an anti-corrosion composition therewith, but the same can be done for a somewhat improved anti-corrosion effect.

The anti-rust compositions of the present invention, comprising the anti-rust agent dissolved in a suitable solvent therefor, preferably a mixture of white spirit and ethanol, with or without the addition of a further corrosion inhibiting agent, may be sprayed onto a metallic surface forming thereon a film which adheres strongly to the metallic surface. Tests carried out in a corrosion cabinet have shown that the neutralized tall oil pitch solution affords good to excellent protection against corrosion, depending on how low the acid number of the neutralized tall oil pitch is, when the composition is sprayed onto a metallic surface.

DESCRIPTION OF THE PREFERRED EMBODIMENTS

The following examples are given to further illustrate the present invention. The scope of the invention is not, however, meant to be limited to the specific details of the examples:

EXAMPLE I (Test cooking P-15)

Into a small scale kettle provided with reflux condenser, mixer and water collector were weighed: 9480 g tall oil pitch having the acid number of 46 mg KOH per g, and 2344 g white spirit. Into another container were weighed: 371 g of technical quicklime with CaO content 91±2%, 15 g calcium acetate and 500 g white spirit. Careful mixing. The mix was heated to 143° C. The lime/calcium acetate solution was added gradually, allowing the temperature to rise to 164° C. The heating was continued 2 hours, the temperature rising to 180° C. The mix was cooled by adding 1896 g of white spirit. When the temperature was 123° C., 424 g ethanol were added. Excess calcium oxide was removed from the tall oil pitch solution by centrifuging. For the neutralized pitch the acid number of 6 mg KOH per g and corrosion resistance of 5 in degrees Re, as defined below, were found.

EXAMPLE II (Test cooking P-42)

Into a small scale kettle provided with reflux condenser, mixer and water collector were weighed: 3000 g tall oil pitch having the acid number of 60 mg KOH per g, and 2500 g white spirit. Into another container were weighed: 300 g of technical quicklime with CaO content 91±2%, 4.8 g calcium acetate and 300 g white spirit. Careful mixing. The tall oil pitch mix was heated to 145° C. The lime/calcium acetate solution was added gradually, allowing the temperature to rise to 187° C. Heating was continued 2 hours, the temperature rising to 195° C. The mix was cooled to 150° C., 121 g of white spirit and 134 g 1-hexanol were added. Excess calcium oxide was removed from the tall oil pitch solution by centrifuging. For the neutralized pitch the acid number of 0 mg KOH per kg was found, and the corrosion resistance value of 0 in degrees Re was found.

EXAMPLE III (Test cooking P-44)

Into a small scale kettle provided with reflux condenser, mixer and water collector were weighed: 3000 g tall oil pitch having the acid number of 38 kg KOH per g, and 2500 g white spirit. Into another container were weighed: 300 g of technical quicklime with CaO content 91±2%, 4.8 g calcium acetate and 300 g white spirit. Careful mixing. The tall oil pitch mix was heated to 155° C. The lime/calcium acetate solution was added gradually, allowing the temperature to rise to 180° C. Heating was continued 2 hours, the temperature rising to 196° C. The mix was cooled to 119° C., 134 g 1-hexanol were added. Excess calcium oxide was removed from the tall oil pitch by centrifuging. For the neutralized pitch the acid number of 0 mg KOH per g and the corrosion resistance value of 0 in degrees Re were found.

Comparative tests were carried out to determine the effect of the acid number on the corrosion-resistance of the tall oil pitch. The results of the tests are illustrated in the table below.

Effect of acid number on the corrosion resistance of the tall oil soft pitch product
The plates were kept in the corrosion cabinet for 28 days = 672 hrs. The temperature varied between 11 and 41° C. 4% sodium chloride solution spray.

| Cooking No. | Acid number of the product, mg KOH/g | Assessment score, Degree Re |
| --- | --- | --- |
| P 12 | 12,73 13 | Re 9 |
| P 13 | 10,55 11 | Re 9 |
| P 9  | 9.81 10  | Re 9 |
| P 21 | 9.10 9   | Re 8 |
| P 14 | 8.38 8   | Re 8 |
| P 11 | 7.27 7   | Re 7 |
| P 15 | 5.83 6   | Re 5 |
| P 22 | 2.34 2   | Re 2 |
| P 42 | 0.00 0   | Re 0 |
| P 44 | 0.00 0   | Re 0 |

The operation of the corrosion cabinet was effected as follows:
The cabinet was operated on a 3-hour cycle:
3 hours heating (heater ON)
3 hours cooling
3 hours cooling (deep-freeze ON)
3 hours warming.

The heating was by means of an electric resistance immersed in a water tank 280×240×150 mm, at the bottom of the cabinet. The cooling was by means of a deep freeze unit affixed to the top of the cabinet.

The plates were suspended in hanging position in a rack over the water bath, with the plates being sprayed with 4% NaCl solution at the beginning of each heating cycle.

The assessment score in "Degree Re" is based on the "ECHELLE EUROPEENNE DE DEGRES D'ENROUILLEMENT POUR PEINTURES ANTIROUILLE" devised by "COMITE EUROPEEN DES ASSOCIATIONS DE FABRICANTS DE PEINTURES ET D'ENCRES D'IMPRIMERIE". In translation this is the "European Scale of Degree of Rusting for Anti-corrosive Paints" which was devised by the Committee of the study of European corrosion scales, appointed by the European committee of paint and printing ink manufacturers associations, based on photographic material supplied by the corrosion committee of the Royal Swedish Academy of Engineering Sciences, Stockholm, 1961. The degree of rusting is on a scale of Re 0 to Re 9. Re 0 means rust free whereas Re 9 means the entire surface is rusty, with the varying degrees of rusting between these limits.

As may be observed, the acid number of the neutralized tall oil pitch is determinative of the degree of corrosion resistance thereof. Best corrosion resistance is obtained with the acid number as close to zero as possible. In this connection it is noted that it is possible to achieve an acid number of zero only by proceeding in accordance with the method of the present invention, the prior art as discussed above not permitting the obtaining of such low acid number.

Still further in accordance with the present invention it has been found that excess calcium oxide remaining after neutralization can have a detrimental effect on the corrosion resistance properties of the coating. Therefore, in accordance with the preferred embodiment of the present invention, the excess calcium oxide is removed after neutralization of the tall oil pitch, this best being accomplished by centrifuging or filtering.

Tall oil pitch neutralized with calcium oxide to an acid number of 16–18 mg KOH/g, as described by Zachary, cannot be used as anti-rust agents. Still further, the excess of lime therein has a detrimental effect on the corrosion resistance properties of the neutralized tall oil pitch.

Likewise, the mixture of tall oil, tall oil pitch and mineral oil, neutralized with lime to an acid number of 8.2, as described in the Patellis patent, does not result in any rust proofing properties for several reasons, namely the higher acid number, the fact that the composition thereof contains only minor amounts of tall oil pitch, and the presence of excess lime remaining after the neutralization, which decreases the corrosion resistance of the compositions.

While the invention has been described in particular with respect to the production of specific tall oil pitch anti-rust compositions, it is apparent that variations and modifications of the invention can be made without departing from the spirit or scope of the invention.

What is claimed is:

1. Method of preventing corrosion, which comprises applying to the surface of a material subject to corrosion an anti corrosion effective amount of an anti-rust agent comprising tall oil pitch neutralized with calcium oxide, said tall oil pitch having an acid number between 0 and 7 mg KOH per g.

2. Method of preventing corrosion, which comprises applying to the surface of a material subject to corrosion an anti corrosion effective amount of the anti-rust agent of claim 1, said anti-rust agent being substantially free of calcium oxide.

* * * * *